United States Patent [19]

Parker et al.

[11] Patent Number: 4,687,651

[45] Date of Patent: Aug. 18, 1987

[54] METHOD FOR PRODUCING AMMONIUM POLYPHOSPHATE

[75] Inventors: John A. Parker, Los Altos, Calif.; Rubin Feldman, Ladue; Robert L. Bryant, Webster Groves, both of Mo.

[73] Assignee: Thermal Science, Inc., St. Louis, Mo.

[21] Appl. No.: 787,429

[22] Filed: Oct. 15, 1985

[51] Int. Cl.$^4$ ............... C01B 15/16; C01B 25/26
[52] U.S. Cl. ............... 423/315; 423/305; 71/43
[58] Field of Search ............ 423/321 R, 315, 305; 71/43

[56] References Cited

U.S. PATENT DOCUMENTS

| | | | |
|---|---|---|---|
| 3,419,349 | 12/1968 | Rohlfs et al. | 423/305 |
| 3,653,821 | 4/1972 | Heymer et al. | 423/305 |
| 3,723,074 | 3/1973 | Sears et al. | 423/305 |
| 3,839,276 | 10/1974 | Rohlfs et al. | 423/305 |
| 3,976,752 | 8/1976 | Corver et al. | 423/305 |
| 3,978,195 | 8/1976 | Schrodter et al. | 423/305 |
| 4,260,592 | 4/1981 | Corver et al. | 423/305 |

FOREIGN PATENT DOCUMENTS

| | | | |
|---|---|---|---|
| 925268 | 5/1973 | Canada | 423/305 |
| 49-22318 | 7/1974 | Japan | 423/315 |

Primary Examiner—Gregory A. Heller
Attorney, Agent, or Firm—Polster, Polster & Lucchesi

[57] ABSTRACT

A method of continuously producing ammonium polyphosphate by the reaction of urea and polyphosphoric acid, over a wide range of molecular weights, in a premix slurry, under controlled temperature of about 315°+/−15° C. The slurry is reacted on a hot, continuously moving surface and forms ammonium polyphosphate in an ammonia atmosphere. Preferably, the premixed slurry is added to a screw-type extruder, where the material comes in contact with the ammonia along the preheated moving surfaces of the extruder. The ammonium polyphosphate is scraped from the extrusion screw into a container with minimum handling. The material can be ground to a finer consistency if desired.

12 Claims, No Drawings

METHOD FOR PRODUCING AMMONIUM POLYPHOSPHATE

BACKGROUND OF THE INVENTION

This invention relates to the production of ammonium polyphosphate. It has particular, but not exclusive, application to producing the type of water-insoluble ammonium polyphosphate useful in fire- and heat-resisting materials.

The term ammonium polyphosphate is used to describe a family of compounds, ranging from water soluble, low molecular weight materials utilized as fertilizers, to highly water insoluble long chain molecules used as starting materials in various manufacturing processes, as fire-fighting materials, and as additives to coatings to give the coatings fire-resistant and heat-resistant properties.

Numerous methods have been proposed and used for producing ammonium polyphosphate. Liquid fertilizer compositions have been formed from direct ammoniation of superphosphoric acid (a mixture of orthophosphoric acid and polyphosphoric acid) with anhydrous ammonia. For example, in Hignett et al, U.S. Pat. No. 3,171,733, superphosphoric acid (76% $P_2O_5$) and anhydrous ammonia are reacted at elevated temperatures and controlled pressure. The process requires continuous agitation and is completed in a time period of one hour or more. The product is a water soluble, linear, low molecular weight material.

In many applications, it is highly desirable to utilize an ammonium polyphosphate having a water solubility of less than about two percent. Materials have been known for about twenty years, having a solubility of about 1.5 percent and are known as "substantially water-insoluble" ammonium polyphosphates. They are believed to be crosslinked, high molecular weight, crystalline materials. Commercial substantially water-insoluble ammonium polyphosphate is sold by Monsanto Company under the designation "PhosChek P-30." It may be noted that the commercial material gives two distinct and almost equal thermochemical decompositions, and is believed to be formed by reaction of urea with orthophosphoric acid. It is therefore believed that the material may actually be a chain incorporating both ammonium polyphosphate and either cyanuric acid or cyamelide in nearly equal proportions, although this surmise has not yet been conclusively demonstrated. The term "substantially water-insoluble ammonium polyphosphate" as used herein includes this material. The substantially water-insoluble ammonium polyphosphates are high molecular weight materials, characterized by P-O-P-bonding.

The known processes for forming crystalline, substantially water-insoluble ammonium polyphosphates are generally characterized by forming the polyphosphate backbone in situ. For example, Shen et al, U.S. Pat. No. 3,397,035, produces the long-chain material by mixing about a 1:1 ratio of substantially water-insoluble crystalline ammonium polyphosphate with a reaction mixture of inorganic phosphate and an inorganic source of ammonia, and heating the mixture. These processes are slow, difficult to control, give limited yield, and require the expenditure of large amounts of energy.

SUMMARY OF THE INVENTION

One of the objects of this invention is to provide a method for producing substantially water-insoluble ammonium polyphosphate in large quantities, in a high yield, and with low energy expenditures.

Another object is to provide such a method which is controllable to provide product of different molecular weights and compositions.

Another object is to provide such a method which produces a product in which substantially all the polymeric linkages are between phosphorus and oxygen atoms (P-O-P bonds).

Another object is to provide such a method which may be carried out continuously, using conventional equipment.

Other objects of this invention will be apparent to those skilled in the art in light of the following description and accompanying drawings.

In accordance with one aspect of this invention, generally stated, a process is provided for the manufacture of ammonium polyphosphate which includes a first step of forming a mixture consisting essentially of one part of a polyphosphoric acid having an equivalent phosphoric acid content of at least about 110% (80% $P_2O_5$) and from about 0.5 to 3.0 parts of urea by weight, and a second step of heating the mixture to a temperature of at least about 150° C. to ammoniate substantially all phosphorus atoms in the polyphosphoric acid.

In the method of the invention, the decomposition of urea is believed to be initiated by the transfer of a proton from the polyphosphoric acid to the oxygen atom of the urea, and not by the spontaneous thermal decomposition of the urea. Therefore, the initial ammoniation rate of the polyphosphoric acid varies inversely with the initial molecular weight of the polyphosphoric acid. A highly suitable reaction rate is achieved using the preferred polyphosphoric acid having an equivalent phosphoric acid content in the range of 115% to 117%. This material is believed to consist primarily of trimeric phosphoric acid.

In the process of the invention, an exothermic reaction takes place between the polyphosphoric acid and urea and forms, almost instantaneously at a temperature of from 150° to 200° C., an average penta ammonium trimer, in the form of a finely divided white crystalline solid. This material has a solubility of about 8%. The material is useful in this form, or it may be converted into a less soluble ammonium polyphosphate in accordance with a further aspect of the invention. The reaction also produces cyanic acid. The fate of the cyanic acid is not yet known, but it may either be lost as a vapor or it may mix in the substantially water-insoluble ammonium polyphosphate either mechanically or by polymerization with it as cyanuric acid or as cyamelide.

In accordance with another aspect of the invention, a process is provided for the continuous manufacture of substantially water-insoluble ammonium polyphosphate, which includes a first step of mixing one part of a polyphosphoric acid and an excess of urea, and a second step of heating the mixture to a temperature of at least 300° C. to form a substantially water-insoluble ammonium polyphosphate.

Preferably, the reactants consist essentially of the polyphosphoric acid and urea, and the reaction is carried out under an ammonia atmosphere. The ammonia atmosphere prevents decomposition of the ammonium polyphosphate during polymerization, but it is preferably at or slightly above atmospheric pressure, to maintain the material in a workable form.

Preferably, the second step of the method is carried out in a heated extrusion device providing continuous heating of an extruder screw which continuously forces the reaction mixture through a reaction barrel. The reaction is carried out by continuously introducing the reactants into the barrel, and using both applied heat and the heat generated by the ammoniation step of the reaction to raise the temperature to about 305° C. The closed barrel contains the ammonia given off during the reaction and maintains the self-generated ammonia atmosphere. Venting is utilized as necessary to maintain a proper pressure within the reactor barrel. The substantially water-insoluble ammonium polyphosphate emerges from the extruder as a mass which is preferably ground to the desired fineness before use.

Preferably, the ammonium polyphosphate has an equivalent phosphoric acid content of at least about 110% (80% $P_2O_5$), most preferably from about 115% to about 120%.

Preferably, the urea is present in a quantity of from 0.5 to 3.0, most preferably about 0.8 to 1.2 parts by weight of the polyphosphoric acid.

Preferably, the reaction is carried out at a temperature of 315°+/−15° C. for a period of from 30 minutes to 180 minutes.

Preferably, the reaction mixture is heated for a period sufficient to provide an ammonium polyphosphate which is less than 1% soluble. It has been found that the present process permits the continuous production of ammonium polyphosphate having a solubility of less than 1%, down to about 0.1%.

Other aspects of the invention will be better understood in light of the following description of the preferred embodiments.

DESCRIPTION OF THE PREFERRED EMBODIMENTS

The preferred processes of the present invention are set out in the following examples.

EXAMPLE 1

Production of Partially Soluble Ammonium Polyphosphate

Into a reactor are added one part of polyphosphoric acid having an equivalent phosphoric acid content of 115% (primarily trimeric phosphoric acid) and one part by weight of finely divided urea. The mixture is heated gently, and an exothermic reaction occurs. At about 100° C. the mixture turns to a milky consistency, and at 140° C. it turns clear. At about 154° C. a highly exothermic reaction occurs, increasing the temperature of the reaction mixture to about 200° C. within less than five minutes. A finely divided ammonium polyphosphate is formed. The material has a solubility of about 8% (equilibrium).

EXAMPLE 2

Batch Production of Substantially Water-Insoluble Ammonium Polyphosphate

The finely divided ammonium polyphosphate produced in accordance with Example 1 is placed in a closed reactor under an ammonia atmosphere and heated with constant mixing. When the temperature of the mixture is increased to 300° C. for a period of fifty minutes, the resulting material is a substantially water-insoluble ammonium polyphosphate having a solubility of less than 1.5%. The material appears to be similar to commercially available substantially water-insoluble ammonium polyphosphate in pH, solubility, thermogravimetric analysis, infrared spectrum, stability in water-based systems, and heat resisting properties. Yield is in excess of 70%.

Heating the material obtained from the process of Example 1 at 300° for a longer period further decreases the solubility of the substantially water-insoluble ammonium polyphosphate. Heating it at 310° provides substantially the same material in substantially the same time, independent of the partial pressure of ammonia and independent of the size of the batch. At 290°, however, only very small batches of material may be successfully polymerized to substantially water-insoluble ammonium polyphosphate.

EXAMPLE 3

Continuous Production of Substantially Water-Insoluble Ammonium Polyphosphate

This Example utilizes a screw-type extruder having an internally heated screw. The barrel of the extruder has a diameter of one foot and a length of twenty feet. The volume between the extruder wall and the screw forms a closed reaction vessel. The screw surface is heated to a constant temperature of 310° C. The extrusion rate is chosen to provide a contact time of less than one hour. Into the extruder is continuously introduced a slurry consisting of one part of polyphosphoric acid having an equivalent phosphoric acid content of 115% (primarily trimeric phosphoric acid) and one part by weight of finely divided urea. The atmosphere within the extruder is quickly filled with outgassed ammonia from the urea. The resulting substantially water-insoluble ammonium polyphosphate may be ground to a fine powder. It has a solubility of less than 1.5% and exhibits properties substantially similar to the substantially water-insoluble ammonium polyphosphate produced in accordance with Example 2.

Numerous variations, within the scope of the appended claims, will be apparent to those skilled in the art in light of the foregoing description.

We claim:

1. A process for the manufacture of substantially water-insoluble ammonium polyphosphate, comprising a step of mixing one part of a polyphosphoric acid having an equivalent phosphoric acid content of at least about 110% and an excess of urea, to form a partially soluble ammonium polyphosphate having a solubility of about 8% in water, and a second step of heating the partially soluble ammonium polyphosphate under an ammonia atmosphere to a temperature of at least 300° C. for a period sufficient to form a substantially water-insoluble ammonium polyphosphate.

2. The process of claim 1 wherein said second step is carried out with constant stirring for a period of at least about thirty minutes.

3. The process of claim 2 wherein said partially soluble ammonium polyphosphate is heated to a temperature of 315° +/−15° C.

4. The process of claim 1 wherein the reactants consist essentially of said polyphosphoric acid and urea.

5. The process of claim 4 wherein said partially soluble ammonium polyphosphate is heated to a temperature of 315° +/−15° C.

6. The process of claim 1 wherein said second step is carried out in a heated extrusion device providing continuous heating of an extruder screw which continuously forces the reaction mixture through a reaction barrel.

7. The process of claim 6, wherein said second step is carried out in a heated extrusion device having an extruder screw which continuously forces the reaction mixture through a reaction barrel.

8. The process of claim 7 wherein a mixture of said polyphosphoric acid and said urea is continuously fed into the barrel of said extruder.

9. The process of claim 1 wherein said ammonium polyphosphate has an equivalent phosphoric acid content of from about 115% to about 120%.

10. The process of claim 1 wherein said urea is mixed in a quantity of from about 0.5 to 3.0 parts by weight of the polyphosphoric acid.

11. The process of claim 1 wherein said urea is mixed in a quantity of from about 0.8 to 1.2 parts by weight of the polyphosphoric acid, and wherein the reaction is carried out at a temperature of $305° +/- 5°$ C. for a period of from 30 minutes to 180 minutes.

12. The process of claim 1 wherein the reaction mixture is heated for a period sufficient to provide an ammonium polyphosphate which is less than 1% soluble.

* * * * *